US011991336B2

(12) United States Patent
Kanematsu

(10) Patent No.: US 11,991,336 B2
(45) Date of Patent: May 21, 2024

(54) INFORMATION PROCESSING APPARATUS CAPABLE OF PREVENTING DAMAGE AND LOSS OF AUDIT LOG WHEN ATTACK DUE TO UNAUTHORIZED ACCESS IS DETECTED, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Shinichi Kanematsu, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/316,534

(22) Filed: May 12, 2023

(65) Prior Publication Data
US 2023/0388435 A1 Nov. 30, 2023

(30) Foreign Application Priority Data

May 25, 2022 (JP) .................... 2022-085375

(51) Int. Cl.
H04N 1/44 (2006.01)
G06F 21/62 (2013.01)
H04N 1/00 (2006.01)
H04N 1/32 (2006.01)

(52) U.S. Cl.
CPC ....... H04N 1/4433 (2013.01); G06F 21/6218 (2013.01); H04N 1/00344 (2013.01); H04N 1/00477 (2013.01); H04N 1/00854 (2013.01); H04N 1/00875 (2013.01); H04N 1/32101 (2013.01); H04N 2201/0094 (2013.01)

(58) Field of Classification Search
CPC ........... H04N 1/00344; H04N 1/00477; H04N 1/00854; H04N 1/00875; H04N 1/32101; H04N 2201/0094; H04N 1/4433; G06F 21/6218
See application file for complete search history.

(56) References Cited

U.S. PATENT DOCUMENTS 8,842,311 B2 * 9/2014 Takasu .................. G06F 21/608
358/1.14
11,423,139 B2 8/2022 Kawazu et al.
2023/0021784 A1 * 1/2023 Michishita ......... H04N 1/32101

FOREIGN PATENT DOCUMENTS

JP 2021005337 A 1/2021

* cited by examiner

Primary Examiner — Scott A Rogers
(74) Attorney, Agent, or Firm — ROSSI, KIMMS & McDOWELL LLP

(57) ABSTRACT

An information processing apparatus capable of preventing damage and loss of an audit log when an attack due to an unauthorized access is detected is provided. The information processing apparatus having one or multiple functions includes a controller configured or programmed to function as a recording unit that records an audit log for each type corresponding to the one or multiple functions, a judging unit that, when an access request to the audit log is received, judges whether or not the access request is an unauthorized access, and a control unit that, in a case that a judgement result of the judging unit indicates that the access request is the unauthorized access, performs a stopping control to stop a function related to the type of the audit log that has received the access request, among the one or multiple functions.

10 Claims, 12 Drawing Sheets

FIG. 8

| | APPLICATION ID 1201 | ADMINISTRATOR ID 1202 | ADMINISTRATOR PASSWORD 1203 | ACCESS AUTHORITY 1204 |
|---|---|---|---|---|
| MANAGEMENT SERVER 1210 | ********** | ***** | ******** | ADMIN_RW |
| DEVICE CONTROL UNIT 1211 | ********** | ***** | ******** | ADMIN_WO |
| COMMUNICATION CONTROL UNIT 1212 | ********** | ***** | ******** | ADMIN_RO |

INFORMATION PROCESSING APPARATUS CAPABLE OF PREVENTING DAMAGE AND LOSS OF AUDIT LOG WHEN ATTACK DUE TO UNAUTHORIZED ACCESS IS DETECTED, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium.

Description of the Related Art

Locations where information processing equipment (information processing apparatuses) and multi-function peripherals are installed and user environments of the information processing equipment (the information processing apparatuses) and the multi-function peripherals are diversifying, and there is an increasing number of usage methods in which access is made not only within a firewall but also directly from an external network such as the Internet. In addition, both inside and outside a company, the occurrence of information leakage, and attacks due to unauthorized operations have become problems. Under such circumstances, regardless of the usage environment, for the purpose of understanding and auditing the usage status of the information processing equipment (the information processing apparatus) or the multi-function peripheral, and preventing the information leakage, a function to record the operation of the information processing equipment (the information processing apparatus) or the multi-function peripheral as a log is known, and such a log is referred to as an audit log. When the information leakage, or an unauthorized access to the information processing equipment (the information processing apparatus) or the multi-function peripheral is discovered, it becomes possible to perform the confirmation of such unauthorized operations by referring to the audit log. The audit log also plays an important role in a zero-trust security environment that strictly performs defense based on a belief that human nature is fundamentally evil, and is used for the purpose of detecting unauthorized operations to the information processing equipment (the information processing apparatus) or the multi-function peripheral and for the purpose of identifying the cause of problems when they occur. Therefore, in the zero-trust security environment, it is essential to have defensive measures to secure the audit log in the case that the audit log has received malicious attacks or access.

Japanese Laid-Open Patent Publication (kokai) No. 2021-5337 discloses a technique, in which with respect to a modification request to a whitelist for judging whether or not access can be managed, in the case of being judged that a module, which is a request source, does not have a due authority, the modification request is rejected.

However, in the technique disclosed in Japanese Laid-Open Patent Publication (kokai) No. 2021-5337, there is a possibility that after that, an attack such as an unauthorized access will continue, and there is a possibility that the attack will lead to damage or loss of the audit log held by the multi-function peripheral, therefore, there is a problem that it is not possible to eliminate those possibilities.

SUMMARY OF THE INVENTION

The present invention provides an information processing apparatus capable of preventing damage and loss of an audit log when an attack due to an unauthorized access is detected, a control method for the information processing apparatus, and a storage medium.

Accordingly, the present invention provides an information processing apparatus having one or multiple functions comprising a controller configured or programmed to function as a recording unit that records an audit log for each type corresponding to the one or multiple functions, a judging unit that, when an access request to the audit log is received, judges whether or not the access request is an unauthorized access, and a control unit that, in a case that a judgement result of the judging unit indicates that the access request is the unauthorized access, performs a stopping control to stop a function related to the type of the audit log that has received the access request, among the one or multiple functions.

According to the present invention, it is possible to prevent the damage and the loss of the audit log when the attack due to the unauthorized access is detected.

Further features of the present invention will become apparent from the following description of exemplary embodiments with reference to the attached drawings.

BRIEF DESCRIPTION OF THE DRAWINGS

FIG. 8 is a diagram for explaining access permission patterns used for judgement performed by an unauthorized access judging unit.

DESCRIPTION OF THE EMBODIMENTS

The present invention will now be described in detail below with reference to the accompanying drawings showing embodiments thereof.

Hereinafter, each preferred embodiment of the present invention will be described in detail with reference to the drawings. However, the configurations described in each preferred embodiment below are merely examples, and the scope of the present invention is not limited by the configurations described in each preferred embodiment. For example, each part that constitutes the present invention is able to be replaced with any configuration that can perform similar functions. Further, arbitrary component or constituent element may be added. Moreover, arbitrary two or more configurations (features) of each preferred embodiment is able to be combined.

In each preferred embodiment, a multi-function peripheral (a digital multi-function peripheral or an MFP) having a user authentication function will be described as an example of an information processing apparatus of the present invention. However, the user authentication function is generally used in a single function peripheral (an SFP) as well. Therefore, the scope of the present invention is not limited to the multi-function peripheral, but may be any information processing apparatus, for example, may be an image forming apparatus or an image processing apparatus.

Figure 1:
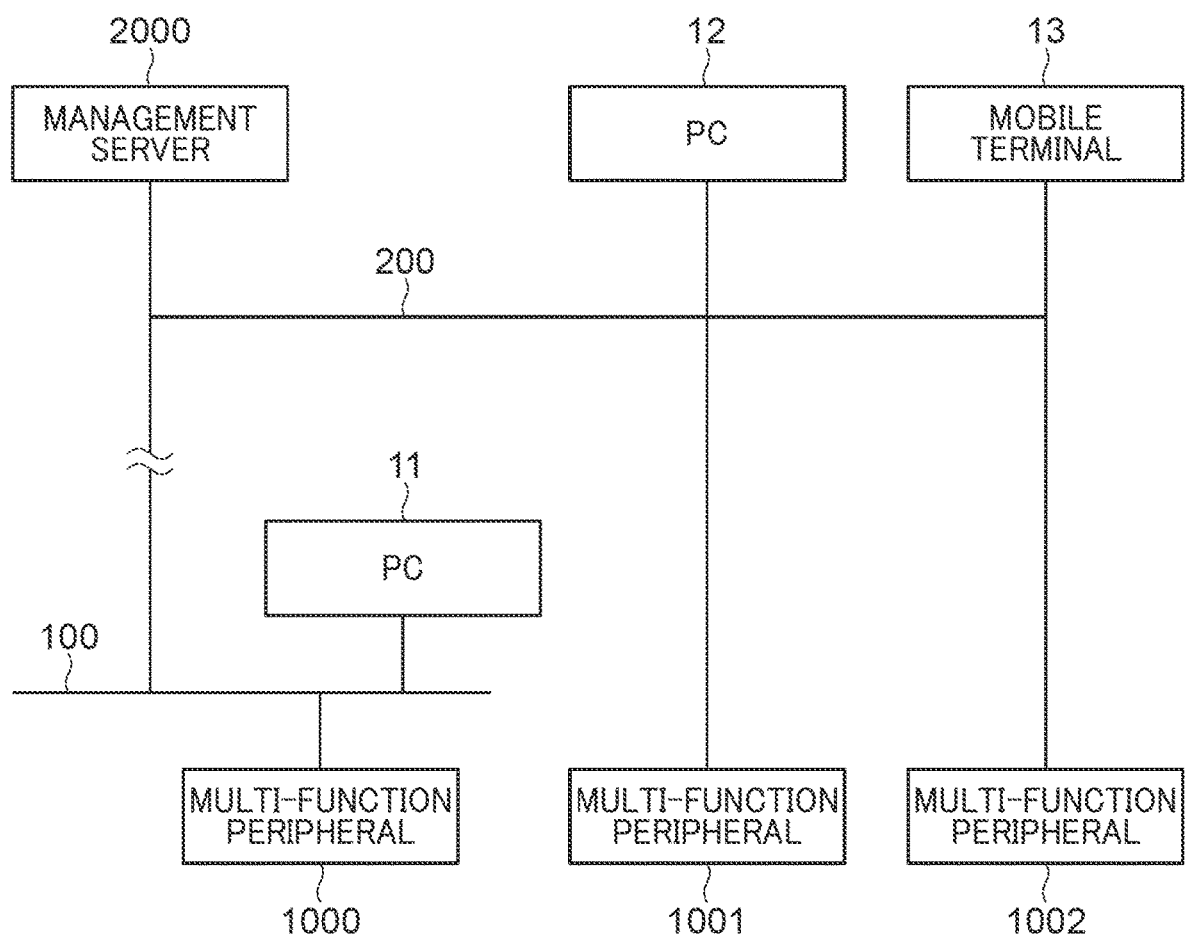
FIG. 1 is a block diagram that shows a configuration of a system including a multi-function peripheral according to a first preferred embodiment of the present invention.

A first preferred embodiment of the present invention will be described below with reference to FIGS. 1 to 10. FIG. 1 is a block diagram that shows a configuration of a system including a multi-function peripheral 1000 (the information processing apparatus of the present invention) according to the first preferred embodiment of the present invention. In addition to the user authentication function described above, the multi-function peripheral 1000 includes a scan function, a print function, an audit log function, etc., and is able to transmit and receive scanned image data, print data, device management information, etc. between devices. This transmission/reception is performed via an internal network 100 with other information processing apparatuses.

It should be noted that in the first preferred embodiment of the present invention, an audit log includes a job log, an authentication log, a UI operation log, an image log, packet information during network communication, etc. The job log is a log that accumulates a history of operations of users and devices such as who has performed what, when, and where. The authentication log is a log that accumulates data about who has performed authentication, when, and where. The UI operation log is a log that accumulates a history of operations that use user interfaces (UI operations). The image log is a log that accumulates image data when executing printing, or reading of a document. However, the types of the audit log accumulated and handled by the multi-function peripheral 1000 vary depending on what information an administrator wishes to audit. For this reason, in some cases, the administrator causes the multi-function peripheral 1000 to accumulate, for example, only the job log and the UI operation log and refer to them, so the types of the audit log are not limited to the above types (that is, the job log, the authentication log, the UI operation log, the image log, the packet information during network communication, etc.).

The multi-function peripheral 1000 is also able to communicate with a management server 2000 via the internal network 100 and an external network 200. Although the internal network 100 is an intracompany network protected by a firewall or a gateway inside the company and the external network 200 is a network directly accessible from the Internet, the internal network 100 is not limited to the intracompany network protected by the firewall or the gateway inside the company, and the external network 200 is not limited to the network directly accessible from the Internet. A personal computer (PC) 11 is able to perform user authentication, reference, and operation with respect to the multi-function peripheral 1000 via the internal network 100. The management server 2000 is able to communicate with a multi-function peripheral 1001, a multi-function peripheral 1002, a PC 12, and a mobile terminal 13 via the external network 200. The multi-function peripheral 1001 and the multi-function peripheral 1002 are multi-function peripherals directly connected to the external network 200. Although the multi-function peripheral 1001 is installed in a shared space such as a coworking space and the multi-function peripheral 1002 is installed at home for home teleworking, the installation location of the multi-function peripheral 1001 is not limited to the shared space, and the installation location of the multi-function peripheral 1002 is not limited to home. The PC 12 and the mobile terminal 13 are able to perform the user authentication, the reference, and the operation with respect to the multi-function peripheral 1001 and the multi-function peripheral 1002 via the external network 200. The multi-function peripheral 1000, the multi-function peripheral 1001, and the multi-function peripheral 1002 not only perform printing, and reading of the document by themselves, but also execute the storage of the print data and the scanned data via the management server 2000.

It should be noted that although the system shown in FIG. 1 includes the one multi-function peripheral 1000, the one multi-function peripheral 1001, the one multi-function peripheral 1002, the one management server 2000, the one PC 11, the one PC 12, and the one mobile terminal 13, the system shown in FIG. 1 is not limited to the configuration of FIG. 1 and may include a plurality of multi-function peripherals 1000, a plurality of multi-function peripherals 1001, a plurality of multi-function peripherals 1002, a plurality of management servers 2000, a plurality of PCs 11, a plurality of PCs 12, and a plurality of mobile terminals 13. In addition, the management server 2000 is not limited to being connected as shown in FIG. 1, and may be connected to another cloud storage via the external network 200.

Figure 2A:
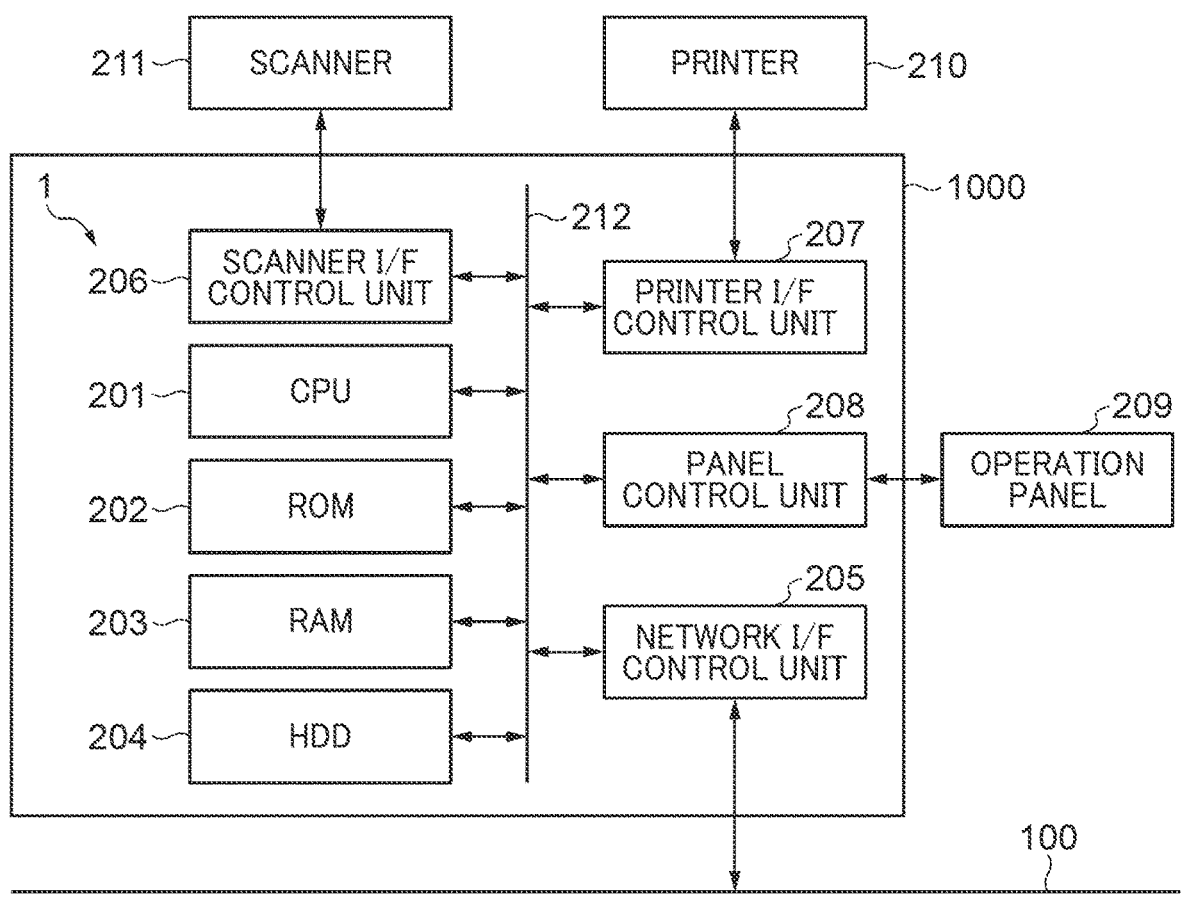
FIG. 2A is a block diagram that shows a hardware configuration of the multi-function peripheral according to the first preferred embodiment of the present invention.

FIG. 2A is a block diagram that shows a hardware configuration of the multi-function peripheral 1000. A central processing unit (CPU) 201 executes software programs of the multi-function peripheral 1000 and performs the control of the entire multi-function peripheral 1000. A ROM 202 is a read-only memory, and stores a boot program, fixed parameters, etc. of the multi-function peripheral 1000. A RAM 203 is a random access memory, and is used for storing the programs, temporary data, etc. when the CPU 201 controls the multi-function peripheral 1000. An HDD 204 is a hard disk drive, and stores system software, applications, and respective pieces of data of the audit log including the job log, the authentication log, the UI operation log, and the image log. The CPU 201 controls operations of the multi-function peripheral 1000 by executing the boot program stored in the ROM 202, expanding programs stored in the HDD 204 to the RAM 203, and executing the expanded programs. A network interface (I/F) control unit 205 controls transmission and reception of data to and from the internal network 100. A scanner OF control unit 206 controls reading of the document performed by a scanner 211. A printer OF control unit 207 controls a printing processing, etc. that are performed by a printer 210. A panel control unit 208 controls a touch panel type operation panel 209, and controls displaying of various kinds of information and inputting of instructions from the user. A bus 212 connects the CPU 201, the ROM 202, the RAM 203, the HDD 204, the network OF control unit 205, the scanner OF control unit 206, the printer OF control unit 207, and the panel control unit 208 to each other. Control signals from the CPU 201 and data signals between components of the multi-function peripheral 1000 except the CPU 201 are transmitted and received via the bus 212. It should be noted that both the multi-function peripheral 1001 and the multi-function peripheral 1002 also have the same hardware configuration as the hardware configuration shown in FIG. 2A.

Figure 2B:
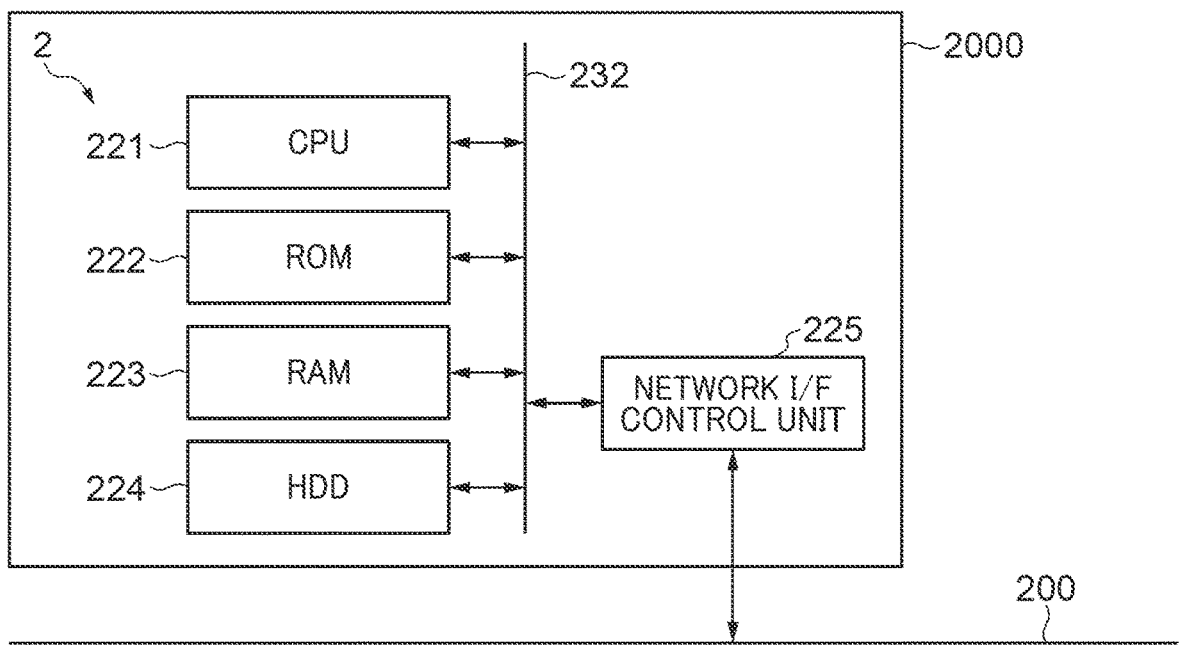
FIG. 2B is a block diagram that shows a hardware configuration of a management server.

FIG. 2B is a block diagram that shows a hardware configuration of the management server 2000. A CPU 221 executes software programs of the management server 2000 and performs the control of the entire management server 2000. A ROM 222 is a read-only memory, and stores a boot program, fixed parameters, etc. of the management server 2000. A RAM 223 is a random access memory, and is used for storing the programs, temporary data, etc. when the CPU 221 controls the management server 2000. An HDD 224 is a hard disk drive, and stores system software, applications, and various kinds of data. The CPU 221 controls operations of the management server 2000 by executing the boot program stored in the ROM 222, expanding programs stored in the HDD 224 to the RAM 223, and executing the expanded programs. A network OF control unit 225 controls transmission and reception of data to and from the external network 200.

In the first preferred embodiment of the present invention, it is assumed that the management server 2000 does not have an operation panel. In this case, the management server 2000 can be operated by using the PC 12 or the mobile terminal 13 via the network I/F control unit 225. In the first preferred embodiment of the present invention, an operation unit displayed on the PC 12 or the mobile terminal 13 is referred to as a remote UI. A bus 232 connects the CPU 221, the ROM 222, the RAM 223, the HDD 224, and the network OF control unit 225 to each other. Control signals from the CPU 221 and data signals between components of the management server 2000 except the CPU 221 are transmitted and received via the bus 232.

Figure 3A:
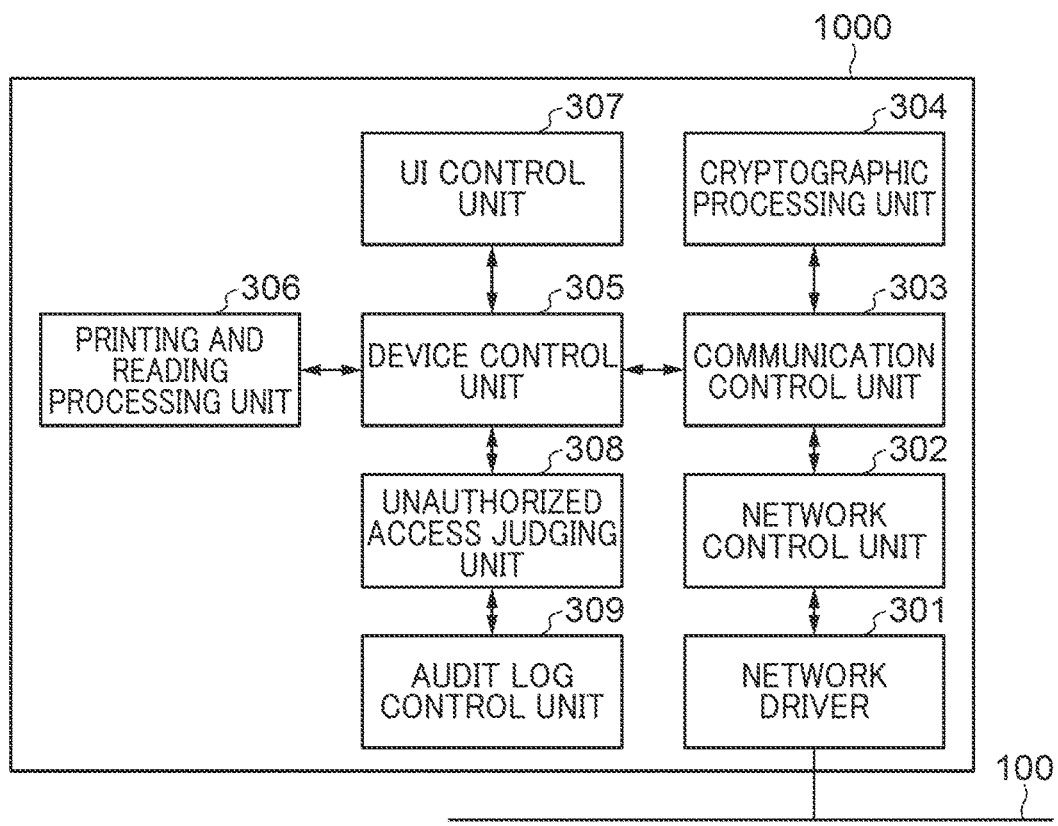
FIG. 3A is a block diagram that shows a software configuration of the multi-function peripheral according to the first preferred embodiment of the present invention.

FIG. 3A is a block diagram that shows a software configuration of the multi-function peripheral 1000. It should be noted that respective software modules shown in FIG. 3A are implemented by the CPU 201 reading the programs stored in the HDD 204 to the RAM 203 and executing the programs. A network driver 301 controls the network OF control unit 205 connected to the internal network 100, and performs transmission and reception of data to and from the outside via the internal network 100. A network control unit 302 controls communications below a transport layer in a network communication protocol such as transmission control protocol/internet protocol (TCP/IP), and performs transmission and reception of data. A communication control unit 303 is a module for controlling a plurality of communication protocols that are supported by the multi-function peripheral 1000. Encrypted communications such as transport layer security (TLS) supported by the multi-function peripheral 1000 are also executed by the communication control unit 303.

A cryptographic processing unit 304 is a module for executing various kinds of cryptographic processes such as a data encryption process, a data decryption process, an electronic signature generation process, an electronic signature verification process, and a hash value generation process. Also, in the encrypted communication process such as TLS performed by the communication control unit 303, the encryption process is performed by the cryptographic processing unit 304. A device control unit 305 is a module for generating control commands and control data of the multi-function peripheral 1000 and integrally controlling the multi-function peripheral 1000. The user authentication instructed via the operation panel 209 and the panel control unit 208, or the network OF control unit 205 is executed by the device control unit 305. The device control unit 305 requests an audit log control unit 309 (a recording unit) through an unauthorized access judging unit 308 to write (record) the operation history of the multi-function peripheral 1000 as an audit log into (on) the HDD 204, and the audit log control unit 309 writes the audit log into the HDD 204.

A printing and reading processing unit 306 is a module for executing functions such as printing performed by the printer 210 and reading of the document performed by the scanner 211. Instructions for printing and reading of the document to the multi-function peripheral 1000 are also able to be executed by the instruction of the user via the operation panel 209. The control of the operation panel 209 and the panel control unit 208 is performed by a UI control unit 307. The unauthorized access judging unit 308 (a judging unit) is a module used to monitor all accesses for obtaining of the audit log and writing of the audit log, which are executed through the audit log control unit 309, and judge the validity of these accesses.

Hereinafter, as shown in FIG. 2A, a controller that implements the respective software modules of the multi-function peripheral 1000 shown in FIG. 3A will be referred to as a controller 1. The controller 1 includes the CPU 201, the ROM 202, the RAM 203, the HDD 204, etc. of the multi-function peripheral 1000. The controller 1 functions as the recording unit, the judging unit, a control unit, and a display control unit. In the following sequence diagram and flowcharts, the part processed by the multi-function peripheral 1000 is stored in any one of the ROM 202, the RAM 203, and the HDD 204 of the controller 1 (that is, is stored in a storage unit of the controller 1) and is executed by the CPU 201. It should be noted that respective software modules of the multi-function peripheral 1001 and a controller that implements the respective software modules of the multi-function peripheral 1001 are similar to those of the multi-function peripheral 1000. In addition, respective software modules of the multi-function peripheral 1002 and a controller that implements the respective software modules of the multi-function peripheral 1002 are also similar to those of the multi-function peripheral 1000.

Figure 3B:
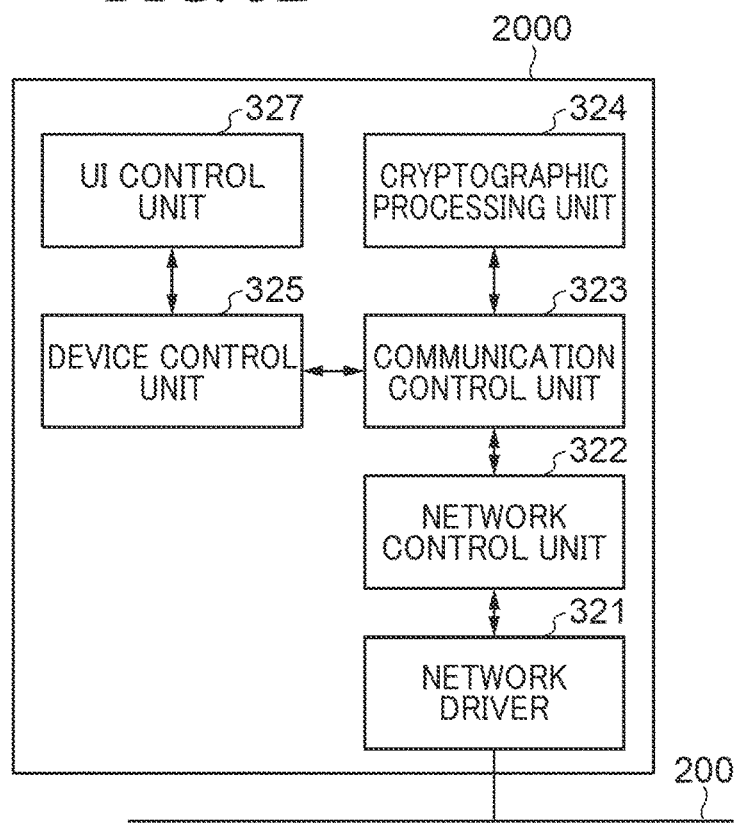
FIG. 3B is a block diagram that shows a software configuration of the management server.

FIG. 3B is a block diagram that shows a software configuration of the management server 2000. It should be noted that respective software modules shown in FIG. 3B are implemented by the CPU 221 reading the programs stored in the HDD 224 to the RAM 223 and executing the programs. A network driver 321 controls the network OF control unit 225 connected to the external network 200, and performs transmission and reception of data to and from the outside via the external network 200. A network control unit 322 controls the communications below the transport layer in the network communication protocol such as TCP/IP, and performs transmission and reception of data. A communication control unit 323 is a module for controlling a plurality of communication protocols that are supported by the management server 2000. Encrypted communications such as TLS supported by the management server 2000 are also executed by the communication control unit 323.

A cryptographic processing unit 324 is a module for executing various kinds of cryptographic processes such as the data encryption process, the data decryption process, the electronic signature generation process, the electronic signature verification process, and the hash value generation process. Also, in the encrypted communication process such as TLS performed by the communication control unit 323, the encryption process is performed by the cryptographic processing unit 324. A device control unit 325 is a module for generating control commands and control data of the management server 2000 and integrally controlling the management server 2000. The device control unit 325 writes the operation history of the multi-function peripheral 1000 into the HDD 224 as the audit log. Operations with respect to the management server 2000 are performed by the remote UI that can be operated from the PC 12 or the mobile terminal 13 via the network OF control unit 225. The control of the remote UI is performed by a UI control unit 327.

Hereinafter, as shown in FIG. 2B, a controller that implements the respective software modules of the management server 2000 shown in FIG. 3B will be referred to as a controller 2. The controller 2 includes the CPU 221, the ROM 222, the RAM 223, the HDD 224, etc. of the management server 2000. In the following sequence diagram and flowcharts, the part processed by the management server 2000 is stored in any one of the ROM 222, the RAM 223, and the HDD 224 of the controller 2 (that is, is stored in a storage unit of the controller 2) and is executed by the CPU 221.

Figure 4:
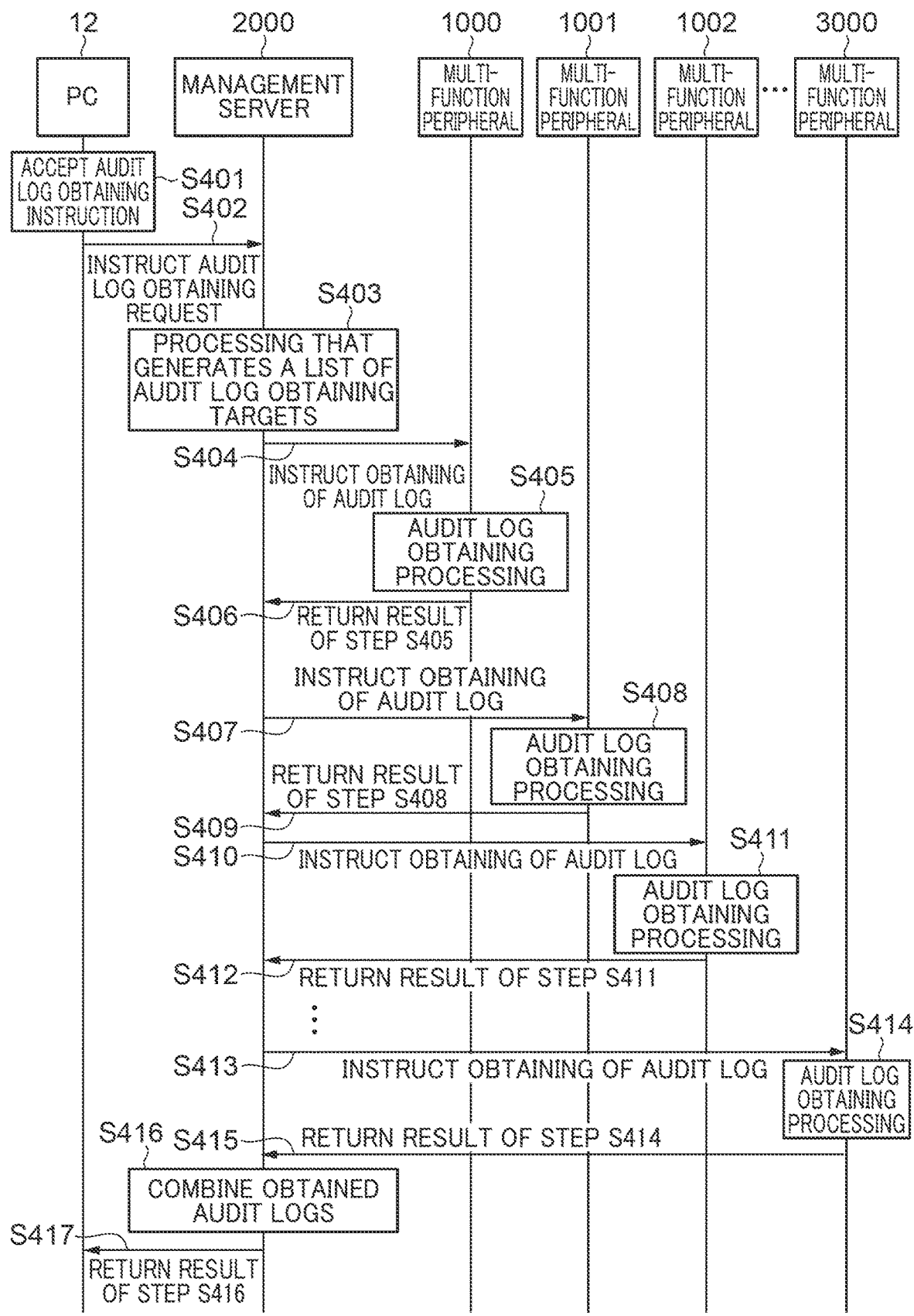
FIG. 4 is a sequence diagram that shows a flow from accepting of an audit log obtaining instruction to audit log transmission, which is executed between the management server and the multi-function peripherals.

FIG. 4 is a sequence diagram that shows a flow from accepting of an audit log obtaining instruction to audit log transmission, which is executed between the management server 2000 and the multi-function peripherals 1000 to 1002. In the first preferred embodiment of the present invention, in addition to the multi-function peripherals 1000 to 1002 that perform the user authentication, accepting of print instructions from the operation panel 209, the print control, etc., and the management server 2000 that obtains audit logs from the multi-function peripherals 1000 to 1002, the PC 12 is present. The PC 12 shares the audit log obtaining instruction with the management server 2000 through the remote UI. Moreover, since all of the multi-function peripherals 1000 to 1002 have the same configuration, the multi-function peripheral 1000 will be used as a representative in the following detailed description. In addition, although the management server 2000 and the multi-function peripherals 1000 to 1002 have separate device configurations, the management server 2000 and the multi-function peripherals 1000 to 1002 are not limited to have separate device configurations, and the functions of the management server 2000 may be included in any one of the multi-function peripherals 1000 to 1002.

The sequence shown in FIG. 4 is started in response to the accepting of the audit log obtaining instruction with respect to the management server 2000. It should be noted that steps S401 to S417 of the sequence are realized by the CPU 221 of the controller 2 of the management server 2000 reading the program stored in the HDD 224 to the RAM 223 and executing it. First, in the step S401, the controller 2 of the management server 2000 accepts the audit log obtaining instruction from the user via the remote UI displayed on the PC 12. The audit log obtaining instruction is original information of the obtaining instruction with respect to the management server 2000 (an audit log obtaining request in the step S402 below). The audit log obtaining instruction includes detailed information such as which of the multi-function peripherals 1000 to 1002 is/are audit log obtaining target(s), and the type and a date and time range of the audit log to be obtained from each audit log obtaining target.

Next, in the step S402, the PC 12 issues (transmits) the audit log obtaining request to the management server 2000. Next, in the step S403, the controller 2 of the management server 2000 performs a processing that generates a list of the audit log obtaining targets based on the detailed information of the received audit log obtaining request. After that, in the step S404, the controller 2 of the management server 2000 instructs the multi-function peripheral 1000 to obtain the audit log, and in the step S405, the multi-function peripheral 1000 performs an audit log obtaining processing. Then, in the step S406, the multi-function peripheral 1000 returns the result of the step S405 to the management server 2000. Subsequently, the processes similar to the steps S404 to S406 are performed between the management server 2000 and the multi-function peripheral 1001 in the steps S407 to S409, and are performed between the management server 2000 and the multi-function peripheral 1002 in the steps S410 to S412.

It should be noted that in FIG. 4, it is assumed that there are a plurality of other multi-function peripherals 3000 having the same configuration as those of the multi-function peripherals 1000 to 1002, and each of them is added to the audit log obtaining targets. In this case, for example, as shown in the steps S413 to S415, the processes similar to the steps S404 to S406 are performed between the management server 2000 and each of the other multi-function peripherals 3000. Next, in the step S416, the controller 2 of the management server 2000 combines the audit logs returned in the steps S406, S409, S412, and S415. Then, in the step S417, the controller 2 of the management server 2000 returns the result of the step S416 to the PC 12.

Figure 5:
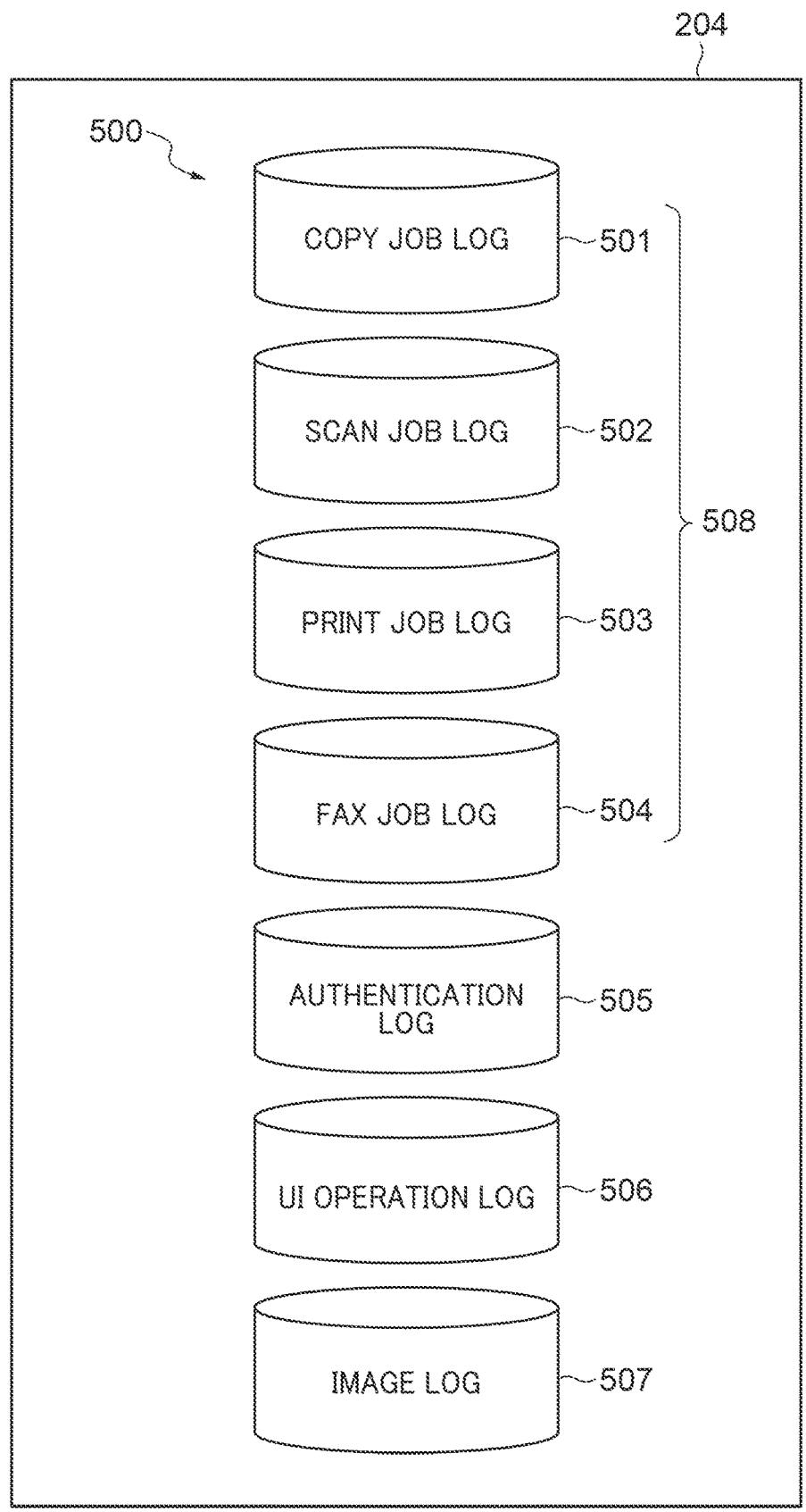
FIG. 5 is a block diagram that shows a configuration of an audit log written into a hard disk drive (an HDD) of the multi-function peripheral.

FIG. 5 is a block diagram that shows a configuration of an audit log 500 written into the HDD 204 of the multi-function peripheral 1000. The audit log 500 includes a copy job log 501, a scan job log 502, a print job log 503, a FAX job log 504, an authentication log 505, a UI operation log 506, and an image log 507. In this way, respective pieces of data of the audit log 500 are managed independently for each type as a data structure. Hereinafter, as a log corresponding to respective job types, the copy job log 501, the scan job log 502, the print job log 503, and the FAX job log 504 will be collectively referred to as a job log 508. The job log 508 is a log in which necessary audit information is written into the HDD 204 each time the multi-function peripheral 1000 performs the operation of each job type. The respective pieces of data of the audit log 500 including the job log 508 are written and stored into the HDD 204 by the audit log control unit 309 that has received a writing request from the device control unit 305 through the unauthorized access judging unit 308 in accordance with various kinds of operations of the multi-function peripheral 1000.

In addition, as shown in FIG. 4, the management server 2000 connected to the external network 200 is able to obtain the respective pieces of data of the audit log 500 from the multi-function peripheral 1000. When the multi-function peripheral 1000 is instructed to obtain the audit log by the management server 2000, the communication control unit 303 obtains the respective pieces of data of the audit log 500 via the device control unit 305, the unauthorized access judging unit 308, and the audit log control unit 309. Furthermore, the communication control unit 303 transmits the respective pieces of data of the audit log 500 to the management server 2000. It should be noted that in the first preferred embodiment of the present invention, although it is assumed that the respective pieces of data of the audit log 500 are managed independently for each type as the data structure, the respective pieces of data of the audit log 500 do not necessarily have to be managed independently. In other words, the respective pieces of data of the audit log 500 may be written into the HDD 204 by a method that allows the respective job types to be identified. Specifically, for example, the respective pieces of data of the audit log 500 with tags for the respective job types corresponding to the copy job log 501, the scan job log 502, etc. are collectively written into the HDD 204.

Figure 6:
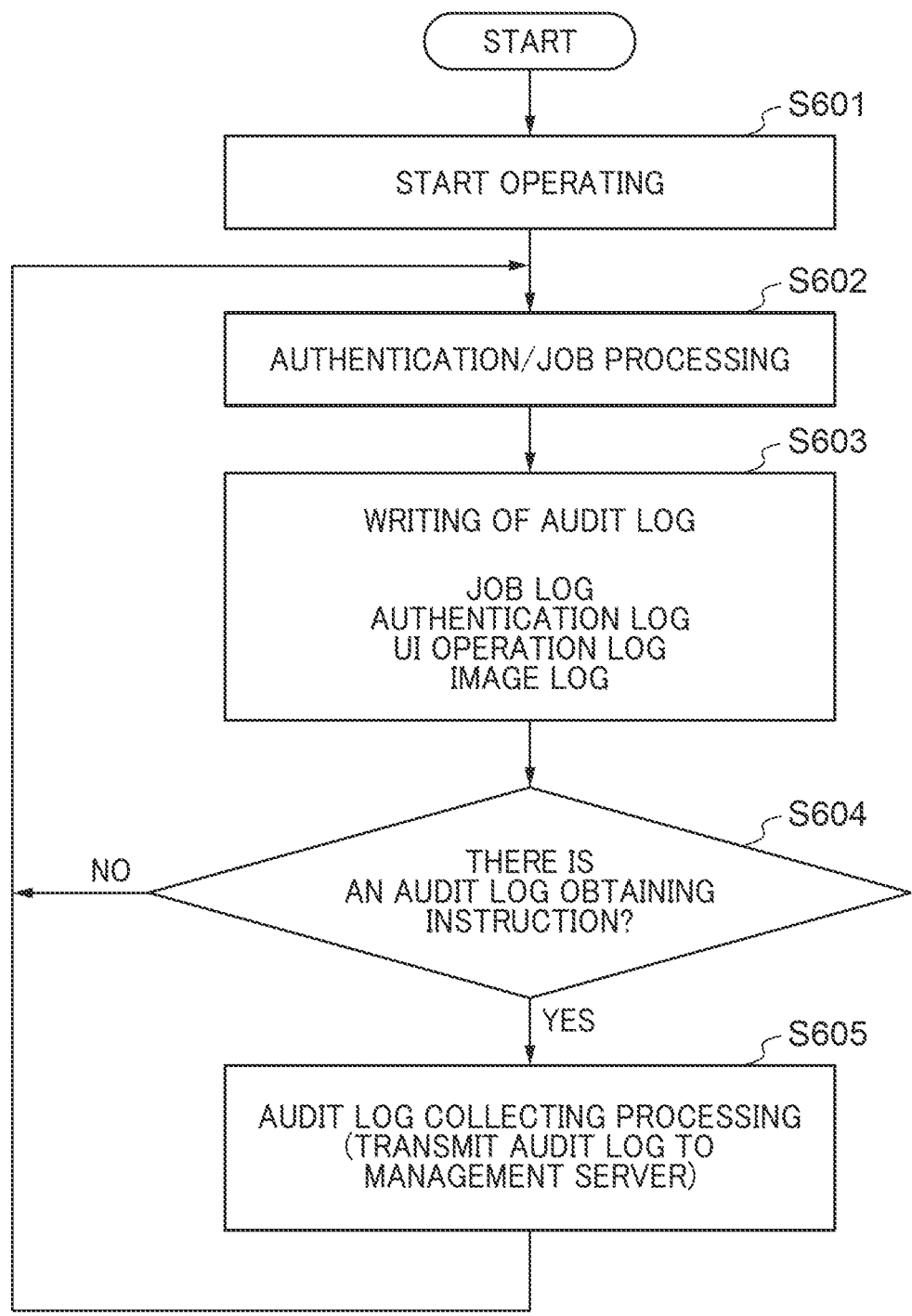
FIG. 6 is a flowchart that shows a steady operating state regarding obtaining of the audit log of the multi-function peripheral.

FIG. 6 is a flowchart that shows a steady operating state regarding obtaining of the audit log 500 of the multi-function peripheral 1000. It should be noted that steps S601 to S605 of the flowchart are realized by the CPU 201 of the controller 1 of the multi-function peripheral 1000 reading the program stored in the HDD 204 to the RAM 203 and executing it. When the multi-function peripheral 1000 starts operating in the step S601, the controller 1 performs an authentication/job processing in the step S602. In the authentication/job processing, upon receiving an operation instruction such as user's login to the multi-function peripheral 1000 or job input, the operation of the multi-function peripheral 1000 is performed by the device control unit 305. Further, in the step S603, the device control unit 305 performs (transmits) a request to write the audit information of the operation of the multi-function peripheral 1000 into the HDD 204 as the audit log 500 (the writing request) to the audit log control unit 309 through the unauthorized access judging unit 308. In response to the writing request, the audit log control unit 309 writes the requested-to-be-written audit information into the HDD 204 as the type of the audit log 500 corresponding to the operation of the multi-function peripheral 1000 (one of the logs indicated by reference numerals 501 to 507) (a recording step). It should be noted that the logs indicated by reference numerals 501 to 507 correspond to the copy job log 501, the scan job log 502, the print job log 503, the FAX job log 504, the authentication log 505, the UI operation log 506, and the image log 507, respectively.

Next, in the step S604, the communication control unit 303 judges whether or not there is the audit log obtaining instruction from the management server 2000. In the case that the communication control unit 303 judges that there is no audit log obtaining instruction, the processing of FIG. 6 returns to the step S602. On the other hand, in the case that the communication control unit 303 judges that there is the audit log obtaining instruction, the processing of FIG. 6 shifts to the step S605. In the step S605, the controller 1 performs an audit log collecting processing. In the audit log collecting processing, an unauthorized access judging processing of FIG. 7, which will be described below, and a processing in the case of being judged that the audit log obtaining instruction (i.e., a request for access to the audit log 500) is an unauthorized access are performed. In the case of being judged that the audit log obtaining instruction, that is, the request for access to the audit log 500 is an authorized access, the controller 1 transmits the audit log 500 to the management server 2000. Thereafter, the processing of FIG. 6 returns to the step S602. In this way, the multi-function peripheral 1000 operates by repeating the same flow which is a steady operation.

Figure 7:
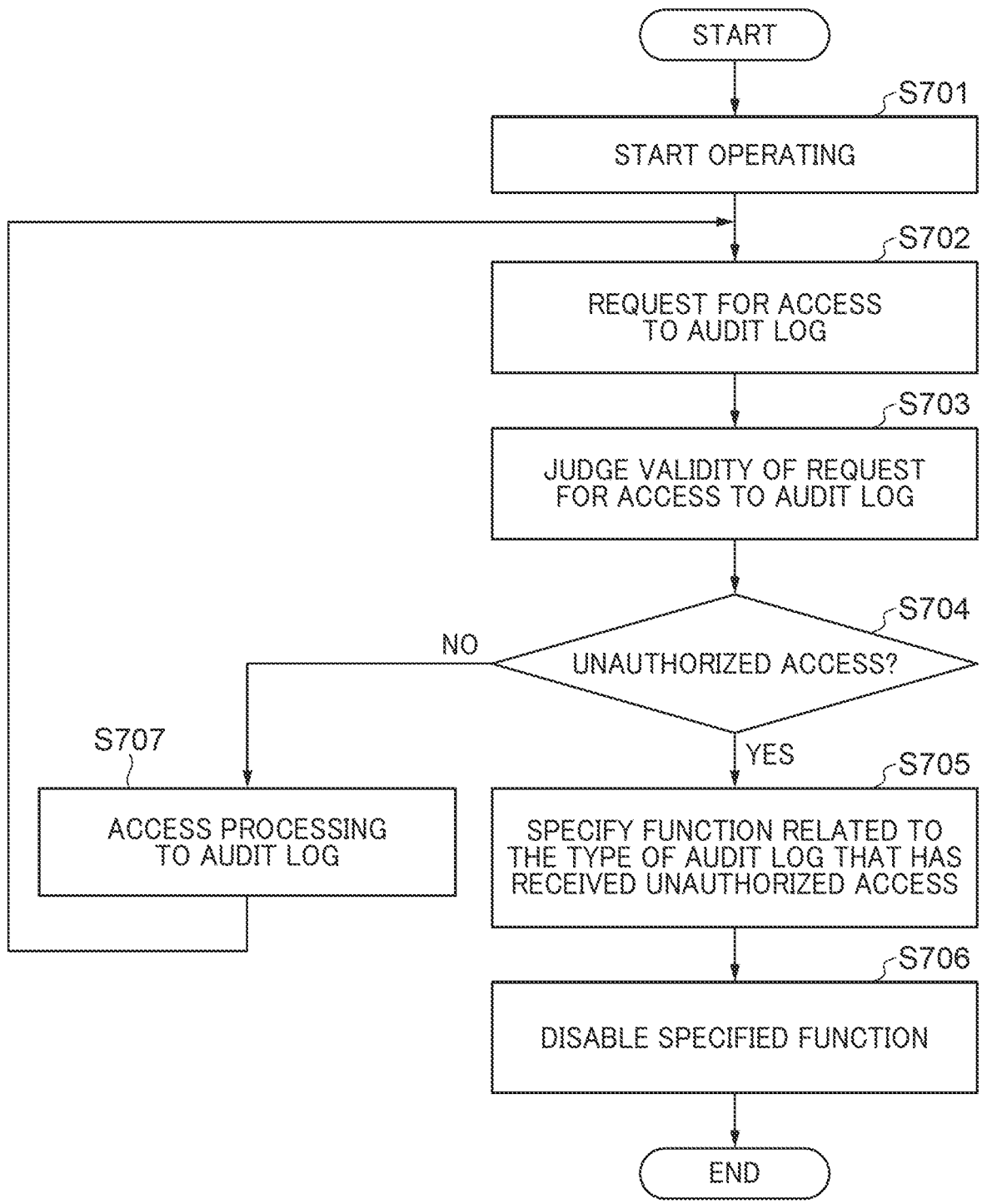
FIG. 7 is a flowchart for explaining a control to secure the audit log in the multi-function peripheral according to the first preferred embodiment of the present invention.

FIG. 7 is a flowchart for explaining a control to secure the audit log 500 in the multi-function peripheral 1000 according to the first preferred embodiment of the present invention. It should be noted that steps S701 to S707 (a control method for the information processing apparatus) of the flowchart are realized by the CPU 201 of the controller 1 (a computer) of the multi-function peripheral 1000 reading the program stored in the HDD 204 to the RAM 203 and executing it. In addition, in the first preferred embodiment of the present invention, in the case that an access request from the management server 2000 is not judged to be the unauthorized access and is an authorized request for access to the audit log 500, according to the flowchart of FIG. 6, the audit log 500 is collected by the management server 2000 and is used for necessary audits. In addition, for all accesses to the audit log 500, only the accesses to the audit log 500 that have passed the unauthorized access judging unit 308 are performed, and the request for access to the audit log 500 is permitted only in the case of matching one of predefined access permission patterns (permission conditions). The judgement by the unauthorized access judging unit 308 is performed by comparing access information added to an access IF of a request command with respect to the unauthorized access judging unit 308 with the predefined access permission patterns.

Here, the configuration of the predefined access permission patterns will be described. FIG. 8 is a diagram for explaining the access permission patterns used for the judgement performed by the unauthorized access judging unit 308. The access permission patterns shown in FIG. 8 are held in a management table stored in the HDD 204, and a definition 1210 for the management server 2000, a definition 1211 for the device control unit 305, and a definition 1212 for the communication control unit 303 are registered. Furthermore, as access judgement items of the definition 1210 for the management server 2000, the definition 1211 for the device control unit 305, and the definition 1212 for the communication control unit 303, an application ID 1201, an administrator ID 1202, an administrator password 1203, and an access authority 1204 are defined. The unauthorized access judging unit 308 judges the validity of all the requests for access to the audit log 500 by collating them with the access permission patterns shown in FIG. 8. In this manner, the multi-function peripheral 1000 according to the first preferred embodiment of the present invention enables the judgement of whether or not the request for access to the audit log 500 is an unauthorized access. Moreover, it is assumed that the management server 2000, which issues (transmits) the request for access to the audit log 500 to the multi-function peripheral 1000, adds correct access information matching the access permission patterns shown in FIG. 8 to the request command. In addition, similarly, regarding the request for access to the audit log 500 of the device control unit 305 or the communication control unit 303 executed in the multi-function peripheral 1000, the correct access information matching the access permission patterns shown in FIG. 8 is added to the request command, and the request for access to the audit log 500 is executed.

Returning to the description of the flowchart of FIG. 7. When the multi-function peripheral 1000 starts operating in the step S701, the request for access to the audit log 500 is performed in the step S702. The request for access to the audit log 500 is, for example, an access request from an external apparatus such as the management server 2000 via the external network 200 and the internal network 100. Furthermore, the request for access to the audit log 500 with respect to the audit log control unit 309 via the operation panel 209 of the multi-function peripheral 1000 is also assumed.

Subsequently, in the step S703, the unauthorized access judging unit 308 judges the validity of the request for access to the audit log 500 by collating the access information added to the access IF of the request command with the access permission patterns shown in FIG. 8 (a judging step). In the case that the unauthorized access judging unit 308 judges in the step S704 that the request for access to the audit log 500 is an authorized access, the processing of FIG. 7 shifts to the step S707. In the step S707, the controller 1 performs an access processing to the audit log 500 according to the request for access to the audit log 500, and then the processing of FIG. 7 returns to the step S702.

On the other hand, in the case that the unauthorized access judging unit 308 judges in the step S704 that the request for access to the audit log 500 is an unauthorized access, the processing of FIG. 7 shifts to the step S705. In the step S705, the unauthorized access judging unit 308 judges that the unauthorized access is the request for access to which type of the types of the audit log 500 (which log of the logs indicated by reference numerals 501 to 507). Accordingly, the function of the multi-function peripheral 1000 related to the type of the audit log 500 that has received the access request (the request for access to the audit log 500) judged to be the unauthorized access is specified. Moreover, in the following description, the access request (the request for access to the audit log 500) judged to be the unauthorized access will be referred to as an unauthorized access request. Further, in the step S706, the unauthorized access judging unit 308 requests the device control unit 305 to disable the function of the multi-function peripheral 1000 specified in the step S705. This disabling request is for disabling the function of the multi-function peripheral 1000 related to the type of the audit log 500 (one of the logs indicated by reference numerals 501 to 507) that has received the unauthorized access request. In response to this, the device control unit 305 causes the function of the multi-function peripheral 1000 that is the target of the disabling request to transition to a state in which subsequent operation requests are not accepted, and blocks access to the type of the audit log 500 that has received the unauthorized access request (a controlling step). In this manner, the controller 1 performs a stopping control to stop the function of the multi-function peripheral 1000 related to the type of the audit log 500 (one of the logs indicated by reference numerals 501 to 507) that has received the unauthorized access request.

Specifically, for example, in the case that the unauthorized access judging unit 308 judges in the step S705 that the unauthorized access request is a request for access to the copy job log 501, in the step S706, the device control unit 305 does not accept subsequent copy job operations. At the same time, the UI control unit 307 (the display control unit) causes the operation panel 209 (a display unit) of the multi-function peripheral 1000 to display a message, which indicates that the copy function of the multi-function peripheral 1000 is unavailable, on a notification screen 800 shown in FIG. 9. An image 801 is a display within the notification screen 800, which indicates that the mode of the multi-function peripheral 1000 is a mode that uses the copy function related to the copy job log 501. An OK button 802 is a button for closing the notification screen 800. As a result, on the operation panel 209 of the multi-function peripheral 1000, regarding the disabled copy function, the message display of the notification screen 800 and the mode display of the image 801 are performed. It should be noted that the same applies in the case that the unauthorized access judging unit 308 judges in the step S705 that the unauthorized access request is a request for access to the scan job log 502, the print job log 503, the FAX job log 504, the authentication log 505, the UI operation log 506, or the image log 507. In this way, in the multi-function peripheral 1000 according to the first preferred embodiment of the present invention, the notification screen 800 displayed on the operation panel 209 is able to inform the user that the stopped function is unavailable. This point also applies to a second preferred embodiment of the present invention described below.

As described above, in response to the unauthorized access request to the audit log 500, the multi-function peripheral 1000 switches the type of the audit log 500 (one of the logs indicated by reference numerals 501 to 507) that has received the unauthorized access request to a secure state. Furthermore, in the multi-function peripheral 1000, the function related to the type of the audit log 500 (one of the logs indicated by reference numerals 501 to 507) that has received the unauthorized access request is disabled. Therefore, when an unauthorized access request to the job log 508 is performed, according to the flowchart of FIG. 7, the copy function, the scan function, the print function, or the FAX function related to the type of the job log 508 that has received the unauthorized access request is disabled. In addition, the same applies in the case that an unauthorized access request to the authentication log 505, the UI operation log 506, or the image log 507 is performed. In this way, in the multi-function peripheral 1000 according to the first preferred embodiment of the present invention, subdivision of function stop due to disabling is realized. This point also applies to the second preferred embodiment of the present invention described below.

It should be noted that in the case that the unauthorized access request to the authentication log 505 is performed, an authentication processing of the multi-function peripheral 1000 is disabled, and the functions of the entire multi-function peripheral 1000 are disabled. In other words, all the functions of the multi-function peripheral 1000 become stop targets of the stopping control. This is because the unauthorized access request to the authentication log 505 has a high risk of attacking the entire multi-function peripheral 1000. In this manner, the multi-function peripheral 1000 according to the first preferred embodiment of the present invention is protected from the unauthorized access request to the authentication log 505. In addition, in the case that the unauthorized access request to the UI operation log 506 is performed, all operations from the operation panel 209 of the multi-function peripheral 1000 are disabled. However, in this case, job input via the internal network 100 that is not via the operation panel 209 is not disabled. Moreover, in the case that the unauthorized access request to the image log 507 is performed, all functions accompanying image processes of the multi-function peripheral 1000 are disabled. Therefore, although the copy function, the scan function, the print function, and the FAX function of the multi-function peripheral 1000 are disabled, the user authentication function not accompanying the image process and the UI operations not accompanying the image processes are not disabled. Therefore, the user is able to log in to the multi-function peripheral 1000 by using the operation panel 209, and is able to perform operations such as checking the status of the multi-function peripheral 1000 and displaying information.

In this manner, when detecting the attack due to the unauthorized access, the multi-function peripheral 1000 according to the first preferred embodiment of the present invention is able to prevent damage and loss of the audit log 50. Therefore, after the unauthorized access request is performed, by incorporating into the operation request of the function related to the type of the audit log 500 (one of the logs indicated by reference numerals 501 to 507) that has received the unauthorized access request, even in the case of receiving repeated attacks to that log, it is possible to prevent. This point is the same even in the case that the unauthorized access judging unit 308 or the audit log control unit 309 is attacked and destroyed after the unauthorized access request is performed.

Figure 10:
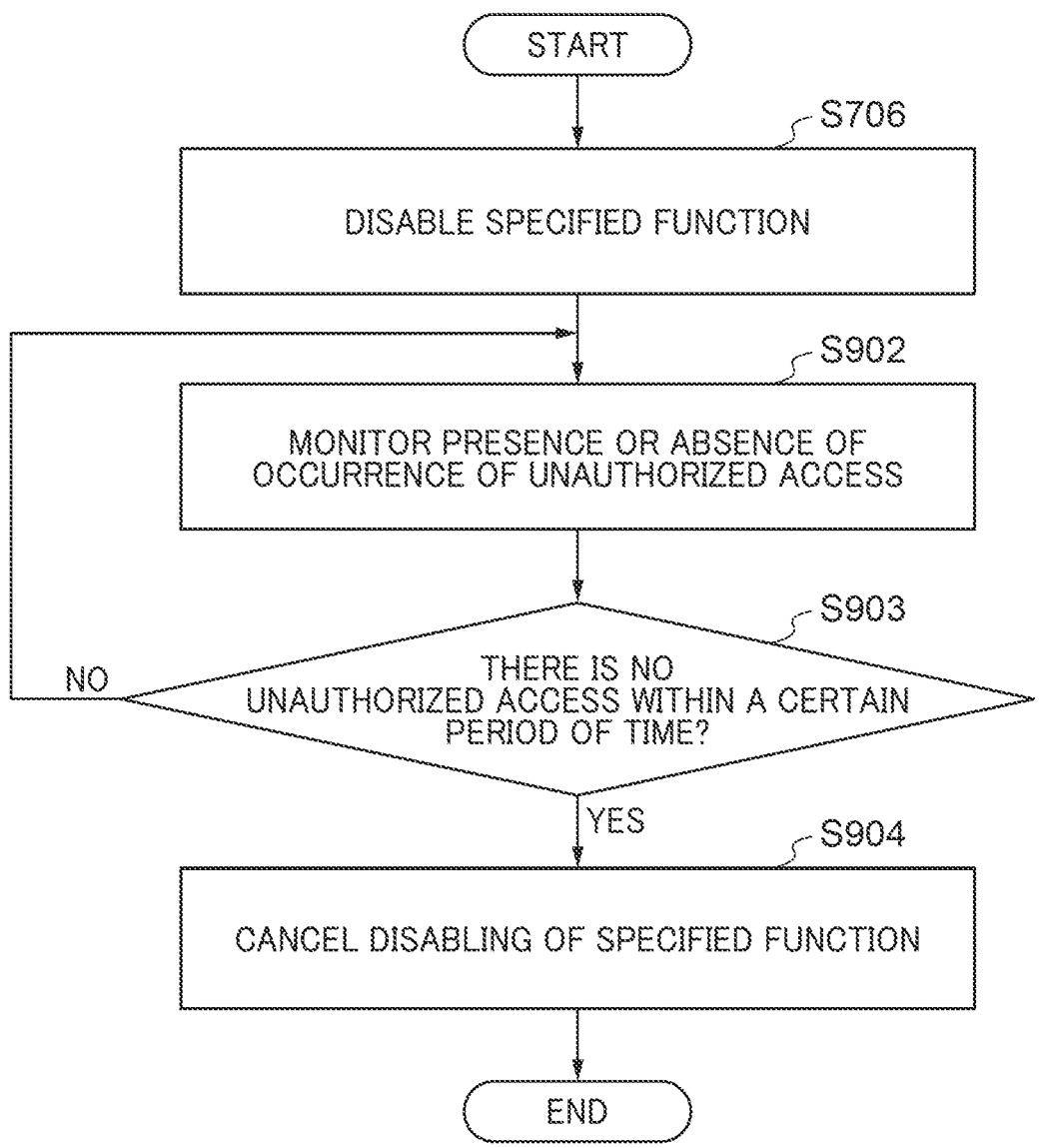
FIG. 10 is a flowchart for explaining the control of the multi-function peripheral in the case of canceling disabling of a specified function in the first preferred embodiment of the present invention.

FIG. 10 is a flowchart for explaining the control of the multi-function peripheral 1000 in the case of canceling disabling of the specified function in the first preferred embodiment of the present invention. An example of restoring the function related to the secured type of the audit log 500 (the secured one of the logs indicated by reference numerals 501 to 507) from a disabled state (the step S706) will be described below with reference to the flowchart of FIG. 10. It should be noted that the step S706 and steps S902 to S904 of the flowchart are realized by the CPU 201 of the controller 1 of the multi-function peripheral 1000 reading the program stored in the HDD 204 to the RAM 203 and executing it.

In the step S706, when the controller 1 disables the function related to the type of the audit log 500 (one of the logs indicated by reference numerals 501 to 507) that has received the unauthorized access request, the processing of FIG. 10 shifts to the step S902. In the step S902, the unauthorized access judging unit 308 monitors an occurrence status of subsequent unauthorized accesses at a preset constant time period. This monitoring is executed in accordance with the above-described judgement of the step S703 that is executed inside the multi-function peripheral 1000 each time a request for access to the audit log 500 occurs. Next, in the step S903, in the case that the unauthorized access judging unit 308 judges that the unauthorized access request continues to occur within a predetermined period of time set in advance, the processing of FIG. 10 returns to the step S902. As a result, the unauthorized access judging unit 308 continuously monitors the occurrence status of the unauthorized accesses. On the other hand, in the step S903, in the case that the unauthorized access judging unit 308 judges that a period of time during which no unauthorized access request has occurred is longer than or equal to the predetermined period of time, the processing of FIG. 10 shifts to the step S904.

In the step S904, the unauthorized access judging unit 308 notifies the device control unit 305 and the UI control unit 307 of canceling the disabling of the specified function. In response to this, the device control unit 305 cancels the job acceptance restriction to enable the job acceptance, and the UI control unit 307 cancels the display of the notification screen 800 shown in FIG. 9 on the operation panel 209. As a result, after the stopping control is performed, the stopping control is canceled after the period of time during which no unauthorized access request has occurred becomes longer than or equal to the predetermined period of time, that is, the stopping control is canceled after the predetermined period of time during which no unauthorized access request has occurred has elapsed. In this way, by canceling the disabling of the specified function and returning to the normal operating state, the multi-function peripheral 1000 according to the first preferred embodiment of the present invention quickly and safely restarts the function to ensure the convenience, and achieves both the protection of the audit log 500 and the availability of the multi-function peripheral 1000.

Figure 11:
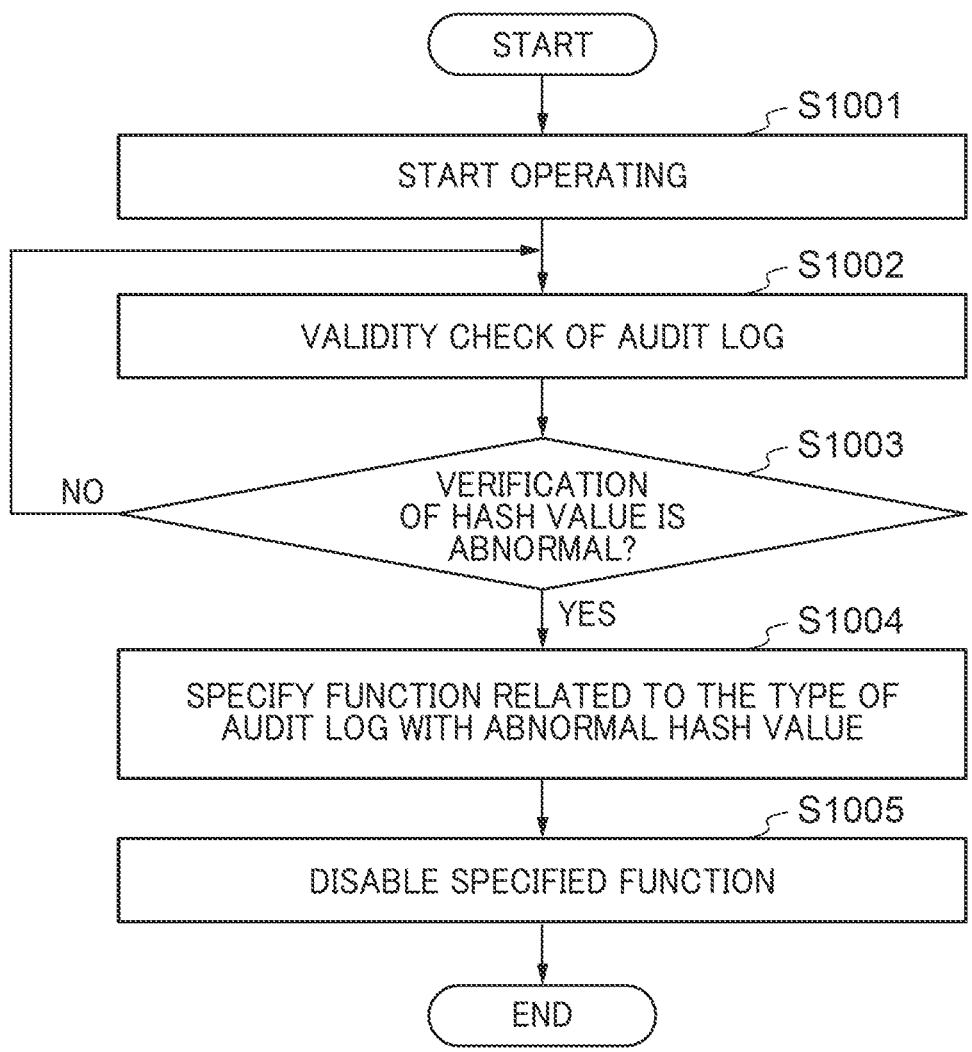
FIG. 11 is a flowchart for explaining a control to secure the audit log in a multi-function peripheral according to a second preferred embodiment of the present invention.

Although the second preferred embodiment of the present invention will be described below with reference to FIGS. 11 and 12, the description will focus on the differences from the first preferred embodiment described above, and the description of the same matters will be omitted. FIG. 11 is a flowchart for explaining a control to secure the audit log 500 in the multi-function peripheral 1000 (the information processing apparatus of the present invention) according to the second preferred embodiment of the present invention. It should be noted that steps S1001 to S1005 (a control method for the information processing apparatus) of the flowchart are realized by the CPU 201 of the controller 1 (the computer) of the multi-function peripheral 1000 reading the program stored in the HDD 204 to the RAM 203 and executing it. In the step S1001, when the multi-function peripheral 1000 starts operating and enters the steady operating state described with reference to FIG. 6, in the step S1002, the audit log control unit 309 (a judging unit) performs a validity check of the respective pieces of data of the audit log 500 (a judging step). The validity check of the respective pieces of data of the audit log 500 is recalculated each time the process of the step S603 of FIG. 6 is performed, that is, each time writing of the audit log 500 is performed. At this time, hash values added to the copy job log 501, the scan job log 502, the print job log 503, the FAX job log 504, the authentication log 505, the UI operation log 506, and the image log 507, respectively, are verified. In this manner, the multi-function peripheral 1000 according to the second preferred embodiment of the present invention enables the judgement of whether or not there is an abnormal piece of data in the audit log 500. Next, in the step S1003, in the case that the audit log control unit 309 judges that the verification of the hash values is normal, the processing of FIG. 11 returns to the step S1002. As a result, the audit log control unit 309 continues the steady operating state of the multi-function peripheral 1000.

Figure 9:
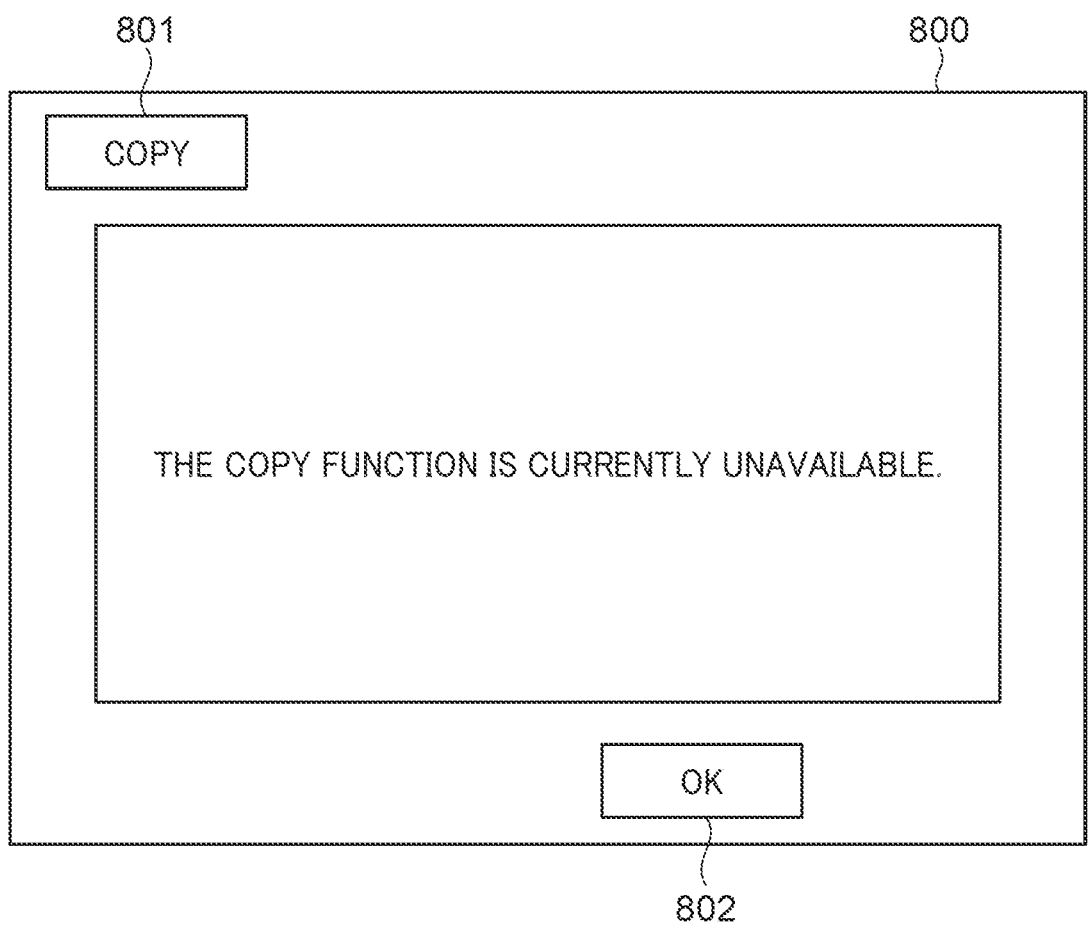
FIG. 9 is a diagram that shows an example of a notification screen displayed on an operation panel of the multi-function peripheral by a user interface (UI) control unit.

On the other hand, in the step S1003, in the case that the audit log control unit 309 judges that the verification of the hash values is abnormal, the processing of FIG. 11 shifts to the step S1004. In the step S1004, the audit log control unit 309 specifies the function related to the type of the audit log 500 (one of the logs indicated by reference numerals 501 to 507) in which the hash value is abnormal. In the step S1005, the audit log control unit 309 instructs the device control unit 305 and the UI control unit 307 to disable the specified function of the multi-function peripheral 1000, and also stops the process of writing to the type of the audit log 500 in which the hash value is abnormal (a controlling step). At that time, the notification screen 800 shown in FIG. 9 is displayed on the operation panel 209. In this manner, the controller 1 performs a stopping control to stop the function of the multi-function peripheral 1000 related to the type of the audit log 500 (one of the logs indicated by reference numerals 501 to 507) that includes a piece of data in which the hash value is abnormal, that is, the controller 1 performs the stopping control to stop the function of the multi-function peripheral 1000 related to the type of the audit log 500 (one of the logs indicated by reference numerals 501 to 507) that includes the abnormal piece of data. Therefore, in the multi-function peripheral 1000 according to the second preferred embodiment of the present invention, by judging that there is an abnormality in one of the respective pieces of data of the audit log 500, that is, by judging that there is a possibility that an attack on the audit log 500 is being carried out by bypassing the judgement of the unauthorized access request, it is possible to shift the audit log 500 to a secure state.

In this manner, when detecting the attack due to the unauthorized access by the abnormal piece of data, the multi-function peripheral 1000 according to the second preferred embodiment of the present invention is able to prevent the damage and the loss of the audit log 50. Therefore, after the abnormal piece of data is detected, by incorporating into the operation request of the function related to the type of the audit log 500 (one of the logs indicated by reference numerals 501 to 507) that includes the abnormal piece of data, even in the case of receiving repeated attacks to that log, it is possible to prevent. This point is the same even in the case that the unauthorized access judging unit 308 or the audit log control unit 309 is attacked and destroyed after the abnormal piece of data is detected.

It should be noted that in the case that there is an abnormality in the piece of data of the authentication log 505, the authentication processing of the multi-function peripheral 1000 is disabled, and the functions of the entire multi-function peripheral 1000 are disabled. In other words, all the functions of the multi-function peripheral 1000 become the stop targets of the stopping control. This is because the abnormality in the piece of data of the authentication log 505 has a high risk of attacking the entire multi-function peripheral 1000. In this manner, the multi-function peripheral 1000 according to the second preferred embodiment of the present invention is protected from the abnormality in the piece of data of the authentication log 505.

Figure 12:
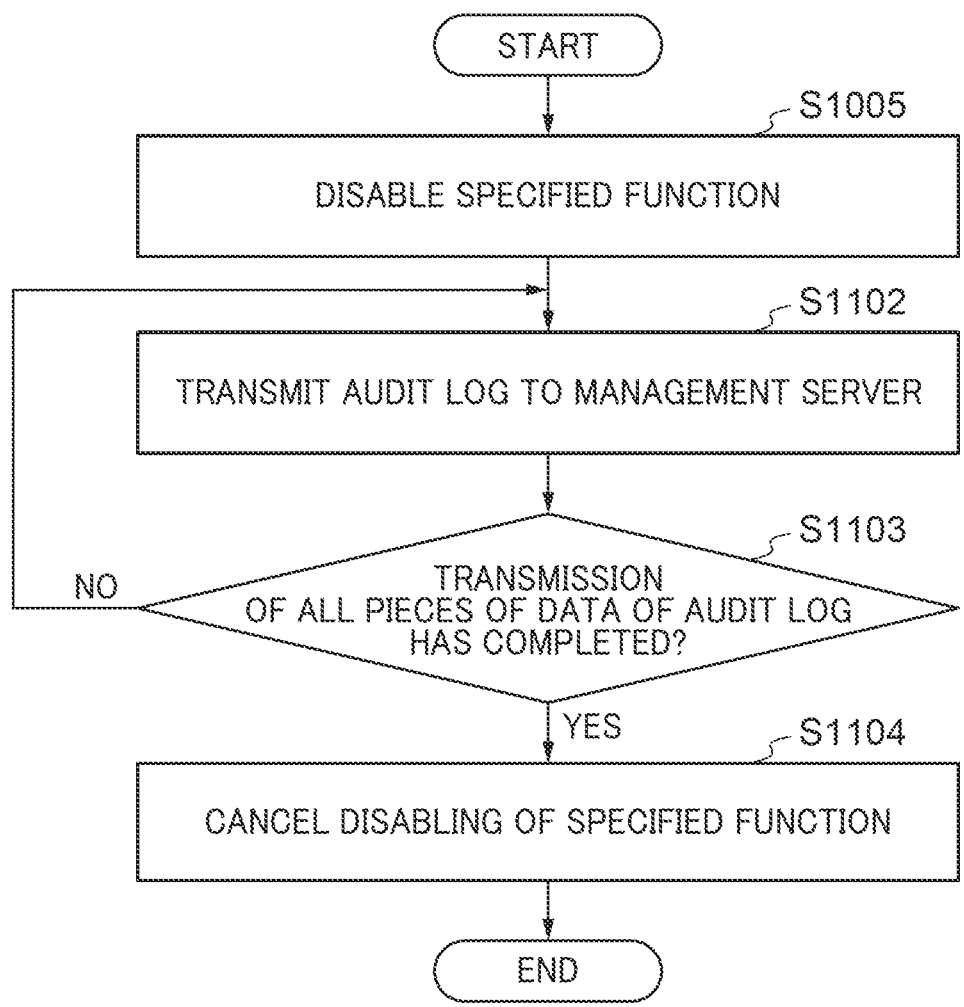
FIG. 12 is a flowchart for explaining the control of the multi-function peripheral in the case of canceling disabling of a specified function in the second preferred embodiment of the present invention.

FIG. 12 is a flowchart for explaining the control of the multi-function peripheral 1000 in the case of canceling disabling of the specified function in the second preferred embodiment of the present invention. An example of restoring the function related to the secured type of the audit log 500 (the secured one of the logs indicated by reference numerals 501 to 507) from a disabled state (the step S1005) will be described below with reference to the flowchart of FIG. 12. It should be noted that the step S1005 and steps S1102 to S1104 of the flowchart are realized by the CPU 201 of the controller 1 of the multi-function peripheral 1000 reading the program stored in the HDD 204 to the RAM 203 and executing it. In the step S1005, when the controller 1 disables the function related to the type of the audit log 500 (one of the logs indicated by reference numerals 501 to 507) in which the hash value is abnormal, the processing of FIG. 12 shifts to the step S1102. In the step S1102, the audit log control unit 309 transmits all pieces of data of the audit log 500 to the management server 2000. This transmission is performed in conjunction with the communication control unit 303. Such a control is performed to migrate all existing pieces of data of the audit log 500 from the multi-function peripheral 1000 to the safe management server 2000 side so as to be collected by the management server 2000 while stopping new writing of the audit log 500.

Then, in the step S1103, when the controller 1 judges that the transfer of all pieces of data of the audit log 500 to the management server 2000 has been completed, the processing of FIG. 12 shifts to the step S1104. At this time, in the multi-function peripheral 1000, since the audit log 500 is once collected by the management server 2000 and is secured, the risk of further unauthorized access requests to the audit log 500 and destruction of the audit log 500 are eliminated. Therefore, in the step S1104, the audit log control unit 309 notifies the device control unit 305 and the UI control unit 307 of canceling the disabling of the specified function. In response to this, the device control unit 305 cancels the job acceptance restriction to enable the job acceptance, and the UI control unit 307 cancels the display of the notification screen 800 shown in FIG. 9 on the operation panel 209. In this way, by canceling the disabling of the specified function and returning to the normal operating state, the multi-function peripheral 1000 according to the second preferred embodiment of the present invention quickly and safely restarts the function to ensure the convenience, and achieves both the protection of the audit log 500 and the availability of the multi-function peripheral 1000.

It should be noted that in the first preferred embodiment of the present invention, the audit log control unit 309 may write a log regarding the access request judged to be the unauthorized access into the HDD 204 so as to be identifiable from the type of the audit log 500 (one of the logs indicated by reference numerals 501 to 507). At that time, the log regarding the access request judged to be the unauthorized access may be managed independently as a new type of the audit log 500, or the log regarding the access request judged to be the unauthorized access with an identification tag may be collectively written into the HDD 204 together with the respective pieces of data of the audit log 500. In this way, since the multi-function peripheral 1000 according to the first preferred embodiment of the present invention is able to leave information about the access request judged to be the unauthorized access, it is possible to perform post-event audit and tracking.

In addition, in the first preferred embodiment of the present invention, instead of the flowchart of FIG. 10, the function related to the secured type of the audit log 500 (the secured one of the logs indicated by reference numerals 501 to 507) may be restored from the disabled state (the step S706) by the flowchart of FIG. 12.

In addition, in the second preferred embodiment of the present invention, instead of the flowchart of FIG. 12, the function related to the secured type of the audit log 500 (the secured one of the logs indicated by reference numerals 501 to 507) may be restored from the disabled state (the step S1005) by the flowchart of FIG. 10. In this case, in the step S902, the audit log control unit 309 monitors an occurrence status of subsequent abnormal pieces of data at a preset constant time period. This monitoring is executed in accordance with the above-described judgement of the step S1002 that is executed each time the process of the step S603 of FIG. 6 is performed, that is, each time writing of the audit log 500 is performed. Next, in the step S903, in the case that the audit log control unit 309 judges that the abnormal piece of data continues to occur within a predetermined period of time set in advance, the processing of FIG. 10 returns to the step S902. As a result, the audit log control unit 309 continuously monitors the occurrence status of the abnormal pieces of data. On the other hand, in the step S903, in the case that the audit log control unit 309 judges that a period of time during which no abnormal piece of data has occurred is longer than or equal to the predetermined period of time, the processing of FIG. 10 shifts to the step S904. In the step S904, the audit log control unit 309 notifies the device control unit 305 and the UI control unit 307 of canceling the disabling of the specified function. As a result, after the stopping control is performed, the stopping control is canceled after the period of time during which no abnormal piece of data has occurred becomes longer than or equal to the predetermined period of time, that is, the stopping control is canceled after the predetermined period of time during which no abnormal piece of data has occurred has elapsed.

Further, although the multi-function peripheral 1000 according to each preferred embodiment causes the multi-function peripheral 1000 itself to restart the function, which have been stopped due to disabling, by using the flowchart of FIG. 10 or FIG. 12, the multi-function peripheral 1000 according to each preferred embodiment may cause a management server or an administrator having a restart authority to restart the function, which have been stopped due to disabling. Specifically, the management server receives a permission from the multi-function peripheral 1000 as a server having the restart authority by using the access permission patterns shown in FIG. 8 or the like, and then restarts the function, which have been stopped due to disabling, by a restart instruction with respect to the multi-function peripheral 1000. Further, the administrator correctly performs authentication as a person who has the restart authority by operating the operation panel 209, and then restarts the function, which have been stopped due to disabling.

Moreover, although the multi-function peripheral 1000 according to each preferred embodiment has multiple functions such as the copy function, the scan function, the print function, and the FAX function, the multi-function peripheral 1000 according to each preferred embodiment is similarly able to prevent the damage and the loss of the audit log 50 even in the case that it is an information processing apparatus having only one function.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-085375, filed on May 25, 2022, which is hereby incorporated by reference herein in its entirety.

What is claimed is:

1. An information processing apparatus having one or multiple functions comprising:
   a controller configured or programmed to function as:
   a recording unit that records an audit log for each type corresponding to the one or multiple functions;
   a judging unit that, when an access request to the audit log is received, judges whether or not the access request is an unauthorized access; and
   a control unit that, in a case that a judgement result of the judging unit indicates that the access request is the unauthorized access, performs a stopping control to stop a function related to the type of the audit log that has received the access request, among the one or multiple functions.

2. The information processing apparatus according to claim 1,
   wherein types of the audit logs are at least an authentication log relating to authentication of the information processing apparatus, a job log relating to job operations of the information processing apparatus, an operation log relating to user interface operations of the information processing apparatus, and an image log relating to image processes of the information processing apparatus.

3. The information processing apparatus according to claim 2,
   wherein, in the case that the judgement result of the judging unit indicates that the access request is the unauthorized access, when the type of the audit log that has received the access request is the authentication log, the control unit makes all of the one or multiple functions to become stop targets of the stopping control.

4. The information processing apparatus according to claim 1, further comprising:
   a management table that holds permission conditions for the access request, and
   wherein the judging unit judges whether or not the access request is the unauthorized access by collating access information added to the access request with the permission conditions of the management table.

5. The information processing apparatus according to claim 1,
   wherein, in the case that the judgement result of the judging unit indicates that the access request is the unauthorized access, the recording unit records a log regarding the access request in the audit log so as to be identifiable from logs regarding the one or multiple functions.

6. The information processing apparatus according to claim 1,
   wherein, in a case that the judging unit does not judge that the access request is the unauthorized access during a predetermined period of time after the stopping control is performed, the control unit cancels the stopping control after the predetermined period of time has elapsed.

7. The information processing apparatus according to claim 1,
   wherein, in a case that transmission of all pieces of data of the audit logs to a management server that manages the information processing apparatus after the stopping control is performed has been completed, the control unit cancels the stopping control.

8. The information processing apparatus according to claim 1, further comprising:
a display unit, and
wherein the controller is further configured or programmed to function as a display control unit that controls the display unit, and
during the stopping control performed by the control unit, the display control unit displays a notification screen, which notifies that the function stopped by the stopping control is unavailable, on the display unit.

9. A control method for an information processing apparatus having one or multiple functions,
the control method comprising:
a recording step of recording an audit log for each type corresponding to the one or multiple functions;
a judging step of, when an access request to the audit log is received, judging whether or not the access request is an unauthorized access; and
a controlling step of, in a case that a judgement result of the judging step indicates that the access request is the unauthorized access, performing a stopping control to stop a function related to the type of the audit log that has received the access request, among the one or multiple functions.

10. A non-transitory computer-readable storage medium storing a program for causing a computer to execute a control method for an information processing apparatus having one or multiple functions,
the control method comprising:
a recording step of recording an audit log for each type corresponding to the one or multiple functions;
a judging step of, when an access request to the audit log is received, judging whether or not the access request is an unauthorized access; and
a controlling step of, in a case that a judgement result of the judging step indicates that the access request is the unauthorized access, performing a stopping control to stop a function related to the type of the audit log that has received the access request, among the one or multiple functions.

* * * * *